United States Patent Office 2,698,815
Patented Jan. 4, 1955

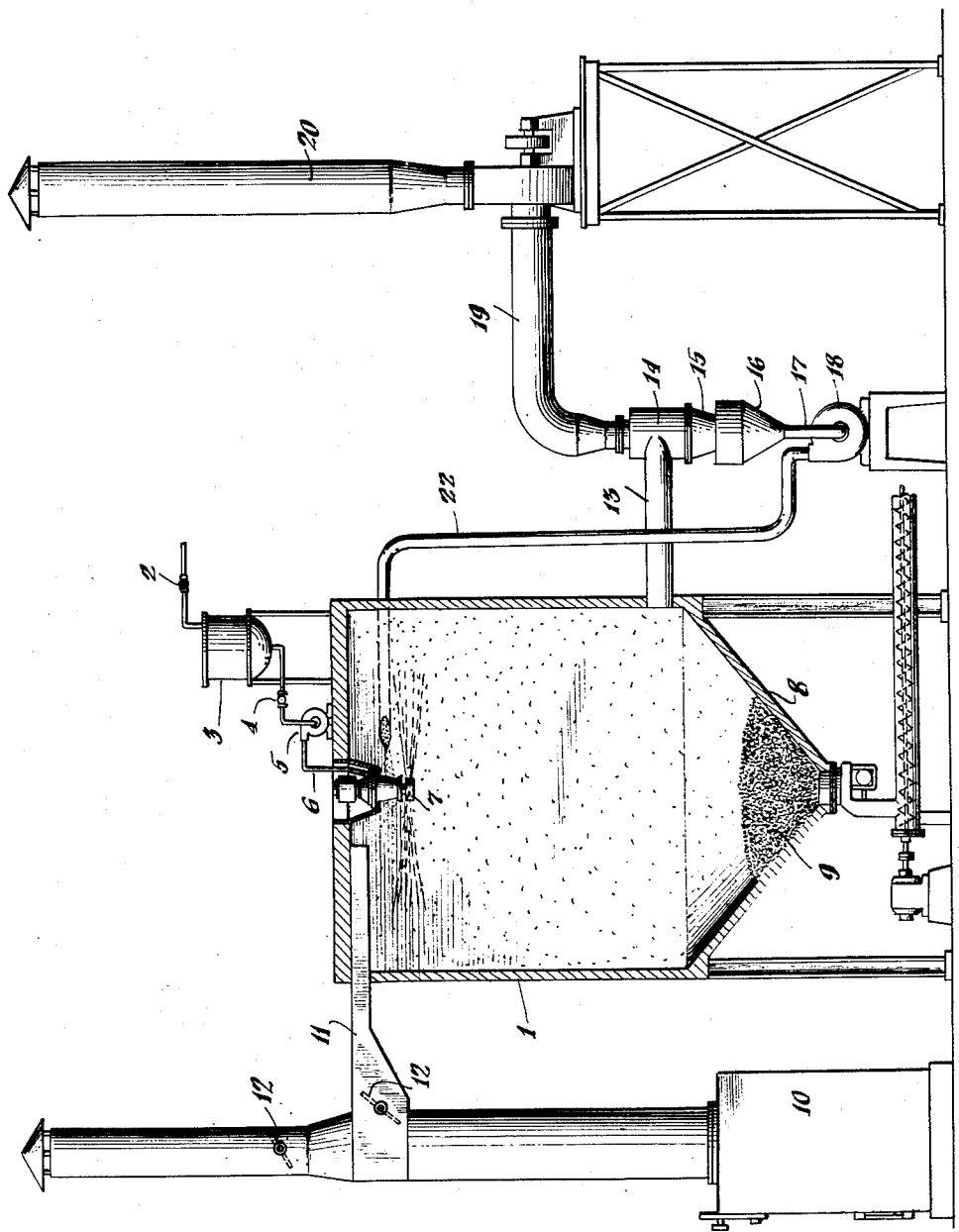

2,698,815

DRYING METHOD AND APPARATUS

Howard B. Bishop, Summit, N. J., assignor to Instant Drying Corporation, a corporation of New York Application June 8, 1950, Serial No. 166,921

4 Claims. (Cl. 117—100)

This invention relates to an apparatus and method for spray drying in such manner as to provide nuclei for the solid granules as formed, convert by-product dust from spray drying operations to granular form, and coat the exterior surfaces of granules from spray drying with a dust serving to decrease adherence of the granules to each other.

The invention will be illustrated first by description in connection with the spray drying of a clay and water slip such as used in ceramic manufacture. In the old art, it was customary to shape tile or other ceramic articles from the slip by a process involving filtering, molding, drying, and then firing. A recent development is the formation of a slip of the desired composition of solids, drying this in part, and then molding the partially dried material under pressure. Articles molded in this manner are then fired directly, without the intervening drying step and accompanying shrinkage.

I have now discovered that I may produce the desired drying by spray technique. I prevent the particles of dried slip from adhering objectionably to each other during and after drying. At the same time, I avoid any change in over-all composition such as is produced when fines, of analysis different from that of the granules, are carried away with the gases from the spray drier.

I accomplish these results by the intimate and continuous admixture of the fines with the atomized slip in the spray drying equipment. In this manner the fines are restored to the composition, so that the analysis of the composition is not altered by the drying operation. In addition the fines coat the solid particles as formed during the drying operation and thus prevent the objectionable caking together of the spray dried particles.

Stated briefly, the method of the invention is the introduction and prompt and thorough commingling of a fine, dry dust with an atomized or sprayed wet flowable material, the material being subjected to spray drying while suspended in a stream of warm air or other drying gas and the gas being separated in a mixture with vapor evaporated from the originally wet material. In the preferred embodiment, the dust introduced is in the form of fines which are being currently produced in the spray drying operation, as, for instance, at a period in the operation just in advance of the reintroduction of the fines into the spray drying chamber. In a modification of the invention, the dust so introduced is foreign or different material as, for instance, a coating dust of desired properties to be applied over granules which are beneficiated by such coating.

The apparatus of the invention comprises means for introducing the dust into the sprayed material being dried and causing quick commingling of the dust with the sprayed material.

The invention will be illustrated in greater detail by description in connection with the attached drawing to which reference is made.

The single figure of the drawing shows a side elevation of my equipment for performing the operations described. The view is partly in section and partly diagrammatic.

Parts not shown or not shown in detail are conventional.

The apparatus includes a spray drying chamber 1, line with valve 12 supplying the material to be dried to tank 3 and then, through line with valve 4, to pump 5 and, through line 6, to the atomizer with spinnerhead 7. The head 7 is rotated at high speed by conventional means. It disperses the delivered material, by atomizing or spraying it by centrifugal force, and causes quick mixing by the resulting whirling motion of the atomized material with the gas and the suspended dust present in the chamber 1.

The drying chamber has a hopper bottom 8 for collecting the resulting granules 9 of sufficiently coarse size to settle from the aeriform suspension in the chamber.

Air or other drying gas from a usual type standard warming unit 10 is delivered through line 11 to the drying chamber, the movement of the gas being controlled in part by the dampers 12.

The outlet line 13 delivers the spent drying gas, with suspended dust particles that are too fine to settle with the granules 9, tangentially into the cyclone 14 with hopper bottom 15. This hopper collects the dust so separated and passes it to the funnel shaped member 16 and, through line 17, to the blower 18. The gas from the cyclone 14 passes to the atmosphere, through line 19 and chimney 20.

The dust delivered from the cyclone to blower 18 is returned through line 22 to the spray drying chamber.

The operation of the equipment and the method of the invention will be largely evident from the description of the drawing that has been given.

In general, the wet material to be spray dried is dispersed in finely divided form in the spray drying chamber. This material may be a solution or a suspension of solids in a liquid medium. The ceramic slip referred to above is an example. The sprayer shown in the drawing is the centrifugal atomizer in the form of a high speed bowl or pan with lateral openings. Into the chamber at the same time, there is introduced a suspension of dry dust in a stream of air or other suitable gas.

If air causes objectionable alteration of the material being dried, as by oxidation, then the dust introduced as well as the heated gas for effecting the drying is an inert gas such as carbon dioxide or nitrogen.

The material to be dried and the dust are maintained in closely intermingled manner and the whole suspension passed towards the discharge or outlet from the chamber.

Temperatures and time of passage of the mixture in the chamber are controlled, in accordance with known technique in spray drying operations, so that the moisture content of the material passing to the discharge is lowered to the percentage desired. A few simple tests will show both satisfactory temperatures and rates of flow through the equipment. These temperatures and rates of flow vary with known materials in conventional manner.

A large part of the dried material settles as granules in the bottom of the chamber. Sometimes these are minute hollow spheres. The unsettled material (dust or fines) goes through a cyclone or like equipment for separating dust from air. Here the fine particles of dust separate and the remaining moist air is vented to the atmosphere.

The dust from the separator is then returned to the spray drying chamber as by means of the blower 18 and line 22 as shown. The gas borne dust is reintroduced into the spray drying chamber at high velocity, so that there is excessive turbulence and quick mixing of the dust with the sprayed material being dried. The lines 11 and 22 and the horizontally rotating distributor 7 deliver the heated drying gas, aeriform dust suspension, and material to be dried, respectively, in approximately horizontal zones, the entrance for the dust suspension being nearer to the side wall of the chamber 1 than the distributor. The zones of entrance of the drying gas and dust suspensions are at least as high as the level of the distributor 7. All of the said zones are near the top of the drying chamber 1. The result is a turbulent, generally horizontal mixing action of the drying air, dust suspension, and material to be dried.

The method is simple and effective in operation. It gives a product in which the fines originally separated are reincorporated in granules of the principal product which are settled and removed from the bottom of the chamber.

The invention will be further illustrated by description in connection with the following examples of the practice of it.

Example 1

In the drying of molasses, it has been found that the dried particles coalesce and are not free flowing. They are hygroscopic, taking up moisture readily from the air. By the introduction of the returned dust and gases in the chamber, as described, along with precipitated tricalcium phosphate, the dried particles of molasses are made free flowing and non-caking.

These results are obtained by proceeding as described above. The material delivered to the atomizer 7 is black strap molasses. Air at 200° F. is blown in, through line 16. Calcium phosphate ($Ca_3PO_4$) in finely milled condition is fed to the receiver 16, in the proportion of ¼% to 1% of the weight of molasses solids (dry basis) supplied to the atomizer.

Example 2

A slip used in making ceramic tile contains 4 or 5 ingredients, some of which are in solution and others are insoluble. In spray drying the slip, there is a tendency for the dust that is carried by the gases into the cyclone to be of chemical composition differing from the main part of the dried granules of slip taken out from the bottom of the drying chamber.

The dust from the cyclone in the spray drying operation is reintroduced continuously into the drying chamber. A uniform and intimate mixture of the various ingredients of the slip is obtained and the steps of drying and handling of the material are facilitated.

Example 3

In drying a purified filler clay, it is also advantageous to return the fine dust particles to the drying chamber and make a final product of larger average particle size and decreased adherence of the particles to each other.

Clay, purified by treatment with water or a solution, as in water washing, settling and classifying operations, is treated as described for the slip in Example 2.

Example 4

In drying fish meal, which is to be used for mixing into feeds, it is desirable to return the fines and introduce at the same time another ingredient that will make the dried material less subject to caking and sticking to the walls of the chamber.

This is accomplished as described in Example 1, the wet ground fish meal being supplied to the spinner 7 and calcium phosphate to the receiver 16, the latter being in the proportion of about 1% of the dry weight of the fish meal.

Example 5

In drying yeast, to produce a product that wets readily on contact with water, a wetting agent is fed with the current of fines so as to be distributed both inside and outside the particles produced in the process of drying.

In greater detail, wet yeast is delivered to the atomizer 7. The wetting agent in the proportion of 1% of the dry weight of the yeast is supplied to the blower 18, as through the receiver 16.

The wetting agent used is one of the non-toxic surface active agents approved for food use. Examples are polyoxyglycol stearate and polyalkyleneoxide derivatives of partial esters of glycerine or glycols with the higher fatty acids, commercial forms of which are sold under the names "Tweens" and "Spans."

Example 6

Concentrated ammonium nitrate solution is supplied to spinner and atomizer 7. Finely pulverized paraffin wax, preferably at about 0° C. or lower is suspended in cold carbon dioxide gas, and blown through line 19 into the chamber 1. Carbon dioxide at the inlet temperature of 100° F. is introduced through inlet 11.

The granules of ammonium nitrate that collect at 9 have a waterproofing wax coating that provides the desired anti-caking effect.

Air may be substituted for carbon dioxide in this example with proper safe-guards against explosion hazards. Also nitrogen may be substituted.

Example 7

The procedure of any of the Examples 1 to 6 is followed except that the dust introduced through line 19 is finely comminuted diatomaceous earth. This dust decreases the tendency of granules of product to cake together into a non-flowable mass.

The proportion of diatomaceous earth used is 1 to 5% by weight of the solids in the material being dried.

The method and apparatus are simple, convenient, and effective for the purposes described.

It will be understood that it is intended to cover all changes and modifications of the examples of the invention herein chosen for the purpose of illustration which do not constitute departures from the spirit and scope of the invention.

What I claim is:

1. Apparatus for spray drying a material and applying dry dust to the exterior of the particles formed during the drying, the apparatus comprising a drying chamber, an inlet for delivering a warm drying gas horizontally into the chamber near the top thereof, a horizontally rotating distributor within the chamber and near the top thereof for dispersing the material to be dried, a line for delivering at high velocity an aeriform suspension of the said dry dust horizontally into the chamber at a level at least as high as that of the rotary distributor and at a position nearer than the distributor to the side wall of the container, and means for removing dried particles from the bottom of the drying chamber, the apparatus in use giving quick intermingling and a turbulent, generally horizontal movement of the mixed drying air, dust suspension, and material to be dried and causing drying of the said material.

2. In spray drying, the process which comprises dispersing the material to be dried in rotary manner and in finely divided form at a position near the top of a drying chamber, delivering a drying gas and a high speed stream of an aeriform suspension of previously dried dust into the chamber at a level at least approximately as high as the position of dispersion of the material to be dried, causing the mixed drying gas, dust suspension, and said material to intermingle in a turbulent generally horizontal movement, causing particles of the dried material to settle in the chamber, and then removing the coated, dried material from the chamber.

3. The process of claim 2, which includes return of fine, unsettled particles of the dried material as a component of the said aeriform suspension of dust.

4. In converting to solid form a fluid mass containing normally solid material, the process which comprises distributing the fluid mass in finely divided form and in a generally horizontal zone within a chamber with closed top and near the top thereof, introducing an aeriform suspension of dry solid particles at high velocity approximately horizontally within the chamber, adjacent to the top thereof, and nearer than the position of distributing the fluid mass to the side wall of the chamber, so as to cause quick intermingling, turbulent movement, and solidification of the normally solid material with the said dry solid particles, discharging from the chamber the solidified material so produced from the lower part of the chamber, and withdrawing gas at a level above that of discharge of the said solidified material.

References Cited in the file of this patent

UNITED STATES PATENTS

| Number | Name | Date |
| --- | --- | --- |
| 1,854,100 | Brito | Apr. 12, 1932 |
| 2,314,159 | Peebles | Mar. 16, 1943 |
| 2,333,333 | Peebles | Nov. 2, 1943 |
| 2,358,683 | Bradshaw | Sept. 2, 1944 |
| 2,361,940 | Hall | Nov. 7, 1944 |
| 2,399,717 | Arveson | May 7, 1946 |
| 2,475,984 | Owen | July 12, 1949 |
| 2,480,694 | Atwood | Aug. 30, 1949 |
| 2,578,315 | Parker | Dec. 11, 1951 |